US010769773B2

(12) United States Patent
Mendels et al.

(10) Patent No.: US 10,769,773 B2
(45) Date of Patent: Sep. 8, 2020

(54) METHOD AND SYSTEM FOR AUTOMATED COUNTING OF MICROSCOPIC FIBERS WITHIN A SAMPLE

(71) Applicant: XRAPID FRANCE, Aix-en-Provence (FR)

(72) Inventors: David Mendels, Jakarta Selatan (ID); Xavier Mulatou, Aix en Provence (FR)

(73) Assignee: XRAPID FRANCE, Aix-en-Provence (FR)

( * ) Notice: Subject to any disclaimer, the term of this patent is extended or adjusted under 35 U.S.C. 154(b) by 0 days.

(21) Appl. No.: 15/996,309

(22) Filed: Jun. 1, 2018

(65) Prior Publication Data

US 2019/0130558 A1 May 2, 2019

(30) Foreign Application Priority Data

Jun. 2, 2017 (FR) ..................... 17 54913

(51) Int. Cl.
| | |
|---|---|
| *H04N 5/00* | (2011.01) |
| *G02B 21/00* | (2006.01) |
| *G02B 21/36* | (2006.01) |
| *G06T 7/00* | (2017.01) |
| *G01N 15/14* | (2006.01) |
| *H04N 5/232* | (2006.01) |
| *G02B 21/24* | (2006.01) |
| *G02B 21/26* | (2006.01) |
| *G06K 9/00* | (2006.01) |
| *G02B 21/14* | (2006.01) |

(52) U.S. Cl.
CPC ....... *G06T 7/0006* (2013.01); *G01N 15/1468* (2013.01); *G02B 21/244* (2013.01); *G02B 21/26* (2013.01); *G02B 21/362* (2013.01); *G02B 21/365* (2013.01); *G06K 9/00134* (2013.01); *G06K 9/00147* (2013.01); *H04N 5/23218* (2018.08); *H04N 5/23232* (2013.01); *H04N 5/232122* (2018.08); *G01N 2015/1486* (2013.01); *G02B 21/14* (2013.01); *G06T 2207/10056* (2013.01); *G06T 2207/10148* (2013.01); *G06T 2207/30108* (2013.01)

(58) Field of Classification Search
CPC ....... H04N 5/23218; G01N 2201/0492; G02B 21/0028; G02B 21/365
USPC .......................................................... 348/79
See application file for complete search history.

(56) References Cited

U.S. PATENT DOCUMENTS

2019/0258046 A1* 8/2019 Gallagher-Gruber ....................... G02B 21/361

* cited by examiner

*Primary Examiner* — Jeffery A Williams
(74) *Attorney, Agent, or Firm* — Arent Fox LLP (57) ABSTRACT

In an aspect of the disclosure, a method, a computer-readable medium, and an apparatus are provided. The method may include placing the sample on the sample-holder of a phase-contrast microscope, establishing a connection between the processor of the mobile terminal and a controller of the microscope, disposing a mobile terminal on a support so that its digital image sensor is positioned in front of an ocular, launching a counting program so that the processor performs successive counting sequences on distinct analysis areas of the sample, wherein between two counting sequences the processor controls a two-axis motorized system to displace the sample, and wherein for each counting sequence the processor implements the following steps of: setting the focus, capturing a main image, and analyzing the main image in order to count the number of fibers.

20 Claims, 8 Drawing Sheets

METHOD AND SYSTEM FOR AUTOMATED COUNTING OF MICROSCOPIC FIBERS WITHIN A SAMPLE

CROSS-REFERENCE TO RELATED APPLICATION(S)

This application claims the benefit of France Application Serial No. 17/54913, entitled "Procédé et système de comptage automatisé de fibre microscopiques dans un échantillon" and filed on Jun. 2, 2017, which is expressly incorporated by reference herein in its entirety.

BACKGROUND

Technical Field

The present disclosure relates generally to communication systems, and more particularly, to a method for automated counting of microscopic fibers within a sample implementing a microscope, as well as a microscope adapted for such a counting method

Introduction

In general, counting fibers within a sample may be used to measure the concentration of fibers in suspension in air or within bulk samples, whether the fibers include natural-origin fibers or artificial fibers.

A current technique may include using a phase-contrast microscope, with an operator who performs a visual counting by manually displacing the sample below the objective of the microscope in order to characterize different areas, and by manually performing the focus of each analyzed area.

Conventionally, this technique may be used for asbestos fibers because of the sanitary risks relating to the asbestos inhalation; the asbestos fibers widely embodying the fibrous form of the mineral silicates belonging to the metamorphic rocks of the serpentine group, that is to say chrysotile (white asbestos), and of the amphibole group, that is to say actinolite, amosite (brown asbestos, cummingtonite-grunerite), anthophyllite, crocidolite (blue asbestos), tremolite, or any mixture containing one or more of these minerals.

However, this manual technique has numerous drawbacks, mainly, the analysis delays and costs as well as the risks of errors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The disclosure concerns the field of counting (or numeration) microscopic fibers within a sample, and finds particular and non-limiting application in counting asbestos fibers, and also in counting fibers other than asbestos including for example artificial vitreous mineral fibers, natural mineral fibers, para-aramid fibers, etc.

In general, the microscopic fibers concerned by the counting method according to the disclosure are fibers having a width (or diameter) smaller than 15 micrometers and larger than 250 nanometers, a length larger than 5 micrometers, and a length-to-width (or diameter) ratio greater than or equal to 3.

The present disclosure aims at providing a counting method which is automated, to the extent that the counting and the displacement and focusing operations are performed in an automatic manner.

Another aim of the disclosure is to provide a counting method which enables an easy and rapid use, and even directly on-site for a reliable and forthwith analysis in situ.

Another aim of the disclosure is to reduce the costs for performing counting of microscopic fibers within a sample.

To this end, it provides a counting method for automated counting of microscopic fibers within a sample, this counting method comprising the following steps of:

providing a phase-contrast type microscope comprising an optical system provided with an ocular, an objective and a motorized focusing system, a sample-holder placed opposite the objective and displaceable according to two directions of an analysis plane by means of a two-axis motorized system, and a controller connected to the motorized focusing system and to the two-axis motorized system;

providing a mobile terminal equipped with a digital image sensor, a screen, a processor and a memory in which is loaded a counting program;

disposing the mobile terminal on a support of the microscope so that the digital image sensor is positioned and held stable in front of the ocular of the microscope with an alignment between the optical axis of the ocular and the center of the digital image sensor;

establishing a connection between the processor of the mobile terminal and the controller of the microscope;

launching the counting program so that the processor of the mobile terminal performs successive counting sequences on distinct analysis areas of the sample, wherein between two successive counting sequences the processor controls the two-axis motorized system to position the objective over a new analysis area of the sample, and wherein for each counting sequence the processor implements the following steps of:

setting the focus on the corresponding analysis area comprising a control of the motorized focusing system;

capturing a main image of the corresponding analysis area by triggering the digital image sensor;

analyzing said main image in order to count the number of microscopic fibers on the corresponding analysis area.

Thus, the counting method according to the disclosure is particularly advantageous because it requires a phase-contrast microscope with specific motorizations, and especially a mobile terminal which will implement the appropriate controls of the motorizations and the counting through an image processing which guarantees a reliable and rapid result, while being inexpensive and easy to use, even for a beginner operator. Furthermore, such a counting method enables counting on different analysis areas by following a predefined scan path, established or calculated (possibly parametrizable) by the counting program so as to guarantee reliability, accuracy and performance.

In a first example, for each counting sequence, the setting of the focus implements an open-loop control in which the processor performs several successive focusing sequences, wherein between two successive focusing sequences the processor controls the motorized focusing system to modify the focus, and wherein for each focusing sequence the processor implements the following steps of:

capturing a secondary image of the corresponding analysis area by triggering the digital image sensor;

analyzing said secondary image in order to establish a value of a sharpness parameter representative of a sharpness of the secondary image;

wherein the focus retained for the capture of the main image corresponds to the focus of the focusing sequence where the value of the sharpness parameter is maximum.

An open-loop control is advantageous for limiting the focus setting time, and thereby reducing the overall counting delay.

In a second example, alternatively to the first example, for each counting sequence, the setting of the focus implements a closed-loop control in which the processor performs the following steps of:

capturing a secondary image of the corresponding analysis area by triggering the digital image sensor;

analyzing said secondary image in order to check whether a sharpness parameter, representative of a sharpness of the secondary image, reaches a predefined maximum threshold, where:

if the sharpness parameter reaches or exceeds said maximum threshold, then the processor stops the control of the motorized focusing system in order to fix the focus for the capture of the main image;

if the focus parameter is below said maximum threshold, then the processor controls the motorized focusing system to modify the focus and repeats the previous steps until the sharpness parameter reaches or exceeds said maximum threshold.

According to one feature, the processor performs the captures of the main images with a given main resolution, and performs the captures of the secondary images with a given secondary resolution which is lower than the main resolution.

Thus, in order to set the focus, low-resolution secondary images are used in order to limit the resources in terms of memory and calculation time, whereas for the image processing for counting, high-resolution main images are used for more accuracy.

According to another feature, the sharpness parameter corresponds to a ratio between a surface area of a halo region characteristic of a phase-contrast microscopy and a surface area of a central area surrounded by the halo region.

Indeed, a phase-contrast microscope produces artifacts or halo effects. By considering as a sharpness parameter the ratio between the halo region and the central region of the object, the focus which maximizes this sharpness parameter corresponds to the best focus, and therefore to the best sharpness. Thus, this optimum focus will serve to obtain the neatest outline of the microscopic fibers and thus guarantee a reliable and accurate counting.

According to a possibility of the disclosure, the processor stops the counting sequences when the number of microscopic fibers counted and cumulated throughout the counting sequences reaches a given fibers threshold or when the number of counting sequences reaches a given sequences threshold.

As a non-limiting example, the fibers threshold is 100 and the sequences threshold is also 100.

In a preferred example, the processor displays on the screen of the mobile terminal the number of counted microscopic fibers and the number of performed counting sequences (which corresponds to the number of analyzed analysis areas) with an update as the counting sequences are carried out.

In an advantageous example, the number of counted microscopic fibers and the number of performed counting sequences are displayed in the form of two progress bars, wherein each progress bar is filled as the corresponding number increases until reaching the end of the progress bar which corresponds to the corresponding fibers threshold or sequences threshold, so that the processor stops the counting sequences as soon as one of the two progress bars is filled.

Advantageously, for each counting sequence, the processor implements a multitask management distributed between a main queue and a background queue, where:

the processor performs in the main queue the steps of capturing images and the steps of controlling the two-axis motorized system and the motorized focusing system, and the processor performs in the background queue the steps of analyzing the images, so that, between two consecutive counting sequences, the processor performs the control of the two-axis motorized system on the main queue before the end and in parallel with the analysis of the main image of the previous counting sequence which is performed on the background queue.

Thus, thanks to such a multitask management between a main queue and a background queue, the calculations are distributed so as to reduce the counting time. In other words, the launch of the tasks is asynchronous so as to contribute to the seamlessness of the user interface.

In a particular example, between two successive counting sequences, the processor controls the two-axis motorized system according to a predefined scan path to position the objective over a new analysis area of the sample while care is taken that said new analysis area is distinct from each of the previously-analyzed analysis areas.

Advantageously, the predefined scan path is a random path.

According to a possibility of the disclosure, the two-axis motorized system comprises:

a first rotary motor driving in rotation a first output shaft on which is mounted a first pinion meshing with a first rack coupled to the sample-holder for a displacement according to a first direction; and a second rotary motor driving in rotation a second output shaft on which is mounted a second pinion meshing which a second rack coupled to the sample-holder for a displacement according to a second direction;

so that, when the processor controls the two-axis motorized system to displace the sample-holder, the processor controls at least one among the first rotary motor and the second rotary motor.

Thus, the first motor and the second motor are in direct engagement with the sample-holder, that is to say without any intermediate reducer therebetween, with pinion/rack transmissions which guarantee compactness, reliability and reduced cost, while enabling sufficient displacement steps (between 50 and 100 micrometers) in order to address the need for scanning the sample on different analysis areas.

According to another possibility, the two-axis motorized system ensures a stepped displacement of the sample-holder according to two directions so that, when the processor controls the two-axis motorized system to displace the sample-holder, the processor controls a stepped displacement of the sample-holder.

In a particular application, the counting method is implemented for automated counting of asbestos fibers within a sample.

The present disclosure also concerns the feature according to which the counting method uses as a mobile terminal a smartphone or a digital tablet or a personal digital assistant.

In accordance with another feature of the disclosure, the connection between the processor of the mobile terminal and the controller of the microscope is established:
- either in a wired manner by means of a wired connector;
- or in a wireless manner by means of a radiocommunication, in particular a short-range radiocommunication such as a for example a Bluetooth™, Bluetooth Low Energy™ or Zigbee™ radiocommunication.

The disclosure also relates to a microscope adapted for the implementation of the counting method according to the disclosure, this microscope being a phase-contrast microscope comprising:
- an optical system provided with an ocular, an objective and a motorized focusing system,
- a sample-holder placed opposite the objective and displaceable according to two directions by means of a two-axis motorized system,
- a controller connected to the motorized focusing system and to the two-axis motorized system; and
- a support mounted on the optical system at the level of the ocular, such a support being shaped so as to support a mobile terminal equipped with a digital image sensor so that said digital image sensor is positioned and held stable in front of the ocular of the microscope with an alignment between the optical axis of the ocular and the center of the digital image sensor.

The disclosure also concerns a system for automated counting of microscopic fibers within a sample, said automated counting system comprising:
- a microscope as described hereinabove; and
- a mobile terminal equipped with a digital image sensor, a screen, a processor and a memory in which is loaded a counting program configured to perform the steps implemented by the processor in the counting method according to the disclosure;
wherein, the support of the microscope supports said mobile terminal so that said digital image sensor is positioned and held stable in front of the ocular of the microscope with an alignment between the optical axis of the ocular and the center of the digital image sensor.

The disclosure also covers a counting program adapted to be loaded in a memory of a mobile terminal and comprising code instructions capable of controlling the execution of the steps implemented by the processor in the counting method according to the disclosure when it is executed on the mobile terminal.

Finally, the disclosure covers a provision of a counting program as described hereinabove on a telecommunication network for its download in a memory of a mobile terminal.

Other features and advantages of the present disclosure will appear upon reading the detailed description hereinafter, of a non-limiting example, made with reference to the appended figures described below.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
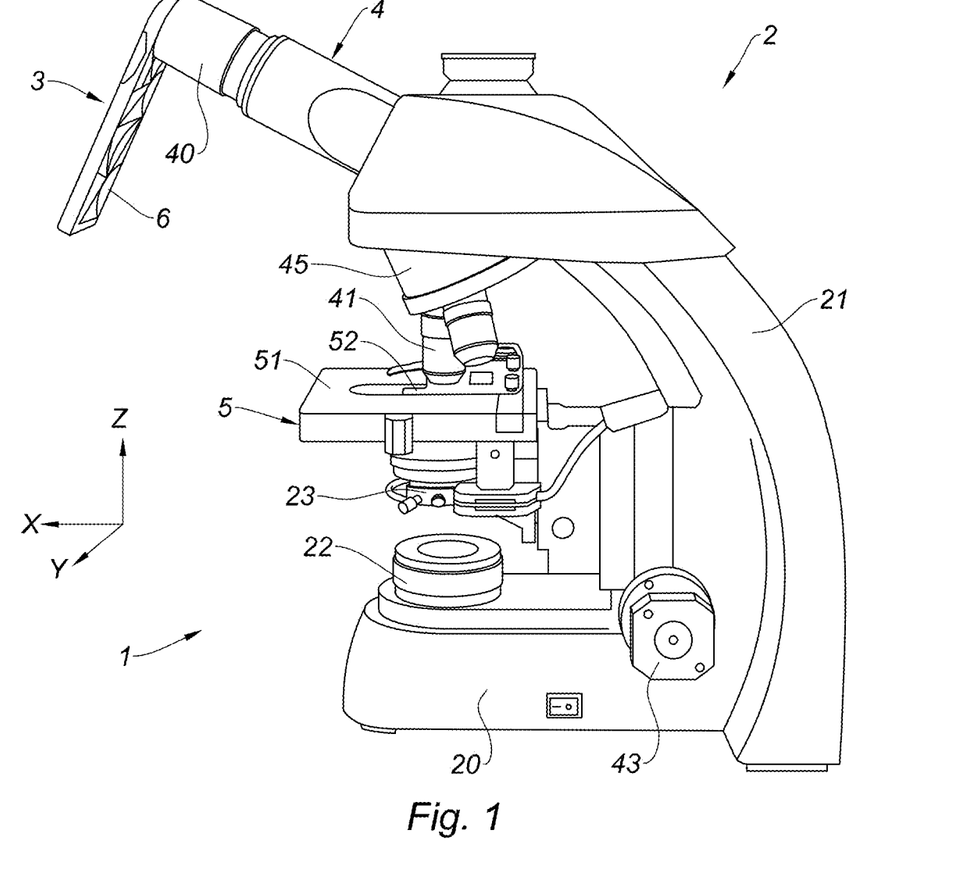
FIGS. 1 and 2 are schematic views, respectively side and front views, of a microscope in accordance with the disclosure.
Figure 2:
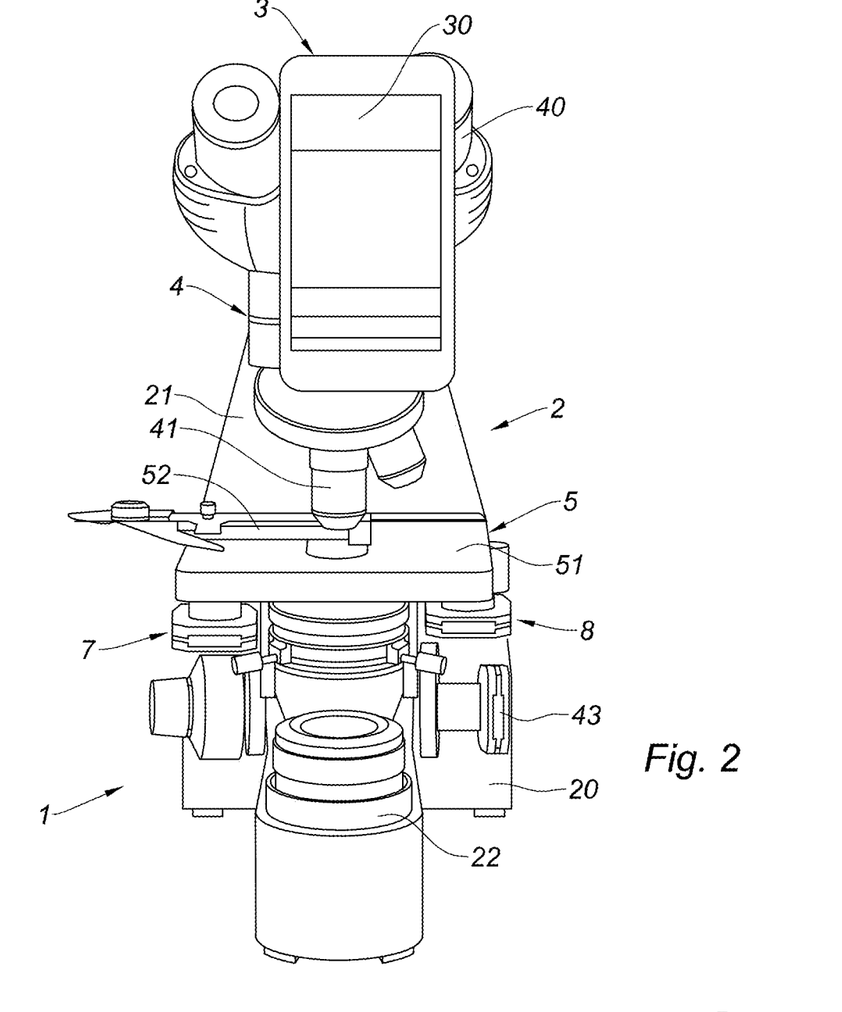
Figure 3:
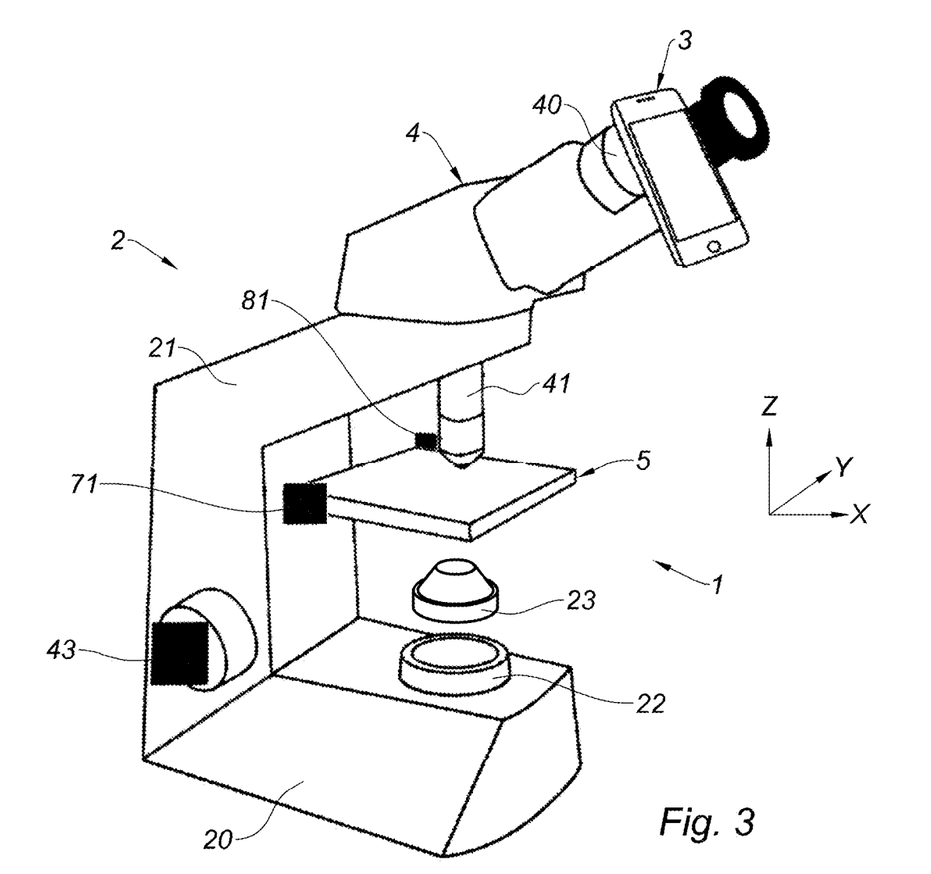
FIG. 3 is a schematic perspective view of another microscope in accordance with the disclosure.
Figures 4, 5:
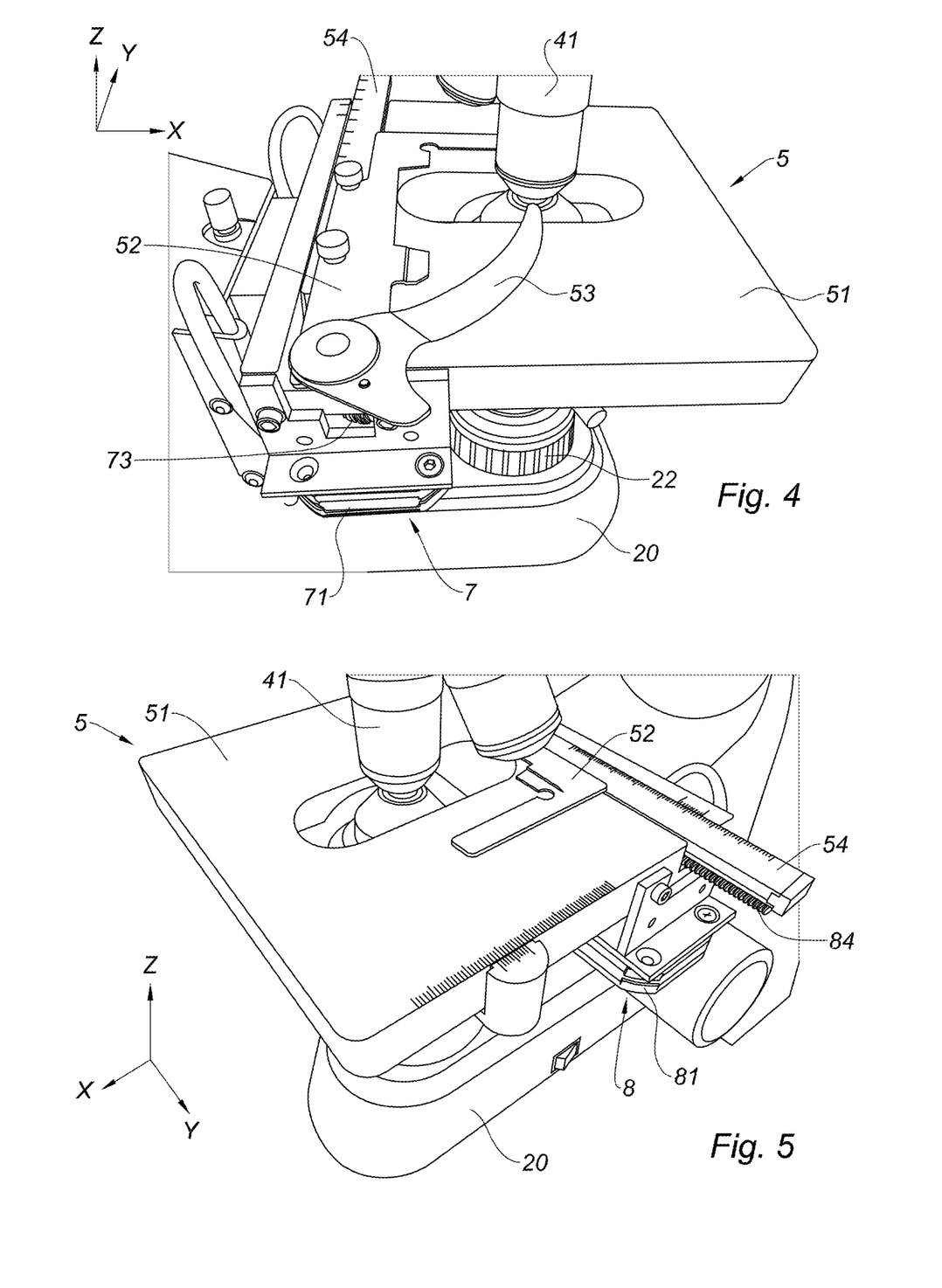
FIGS. 4 and 5 are schematic views, in perspective and enlarged on the sample-holder of the microscope of FIGS. 1 and 2, according to a two different view angles.
Figure 6:
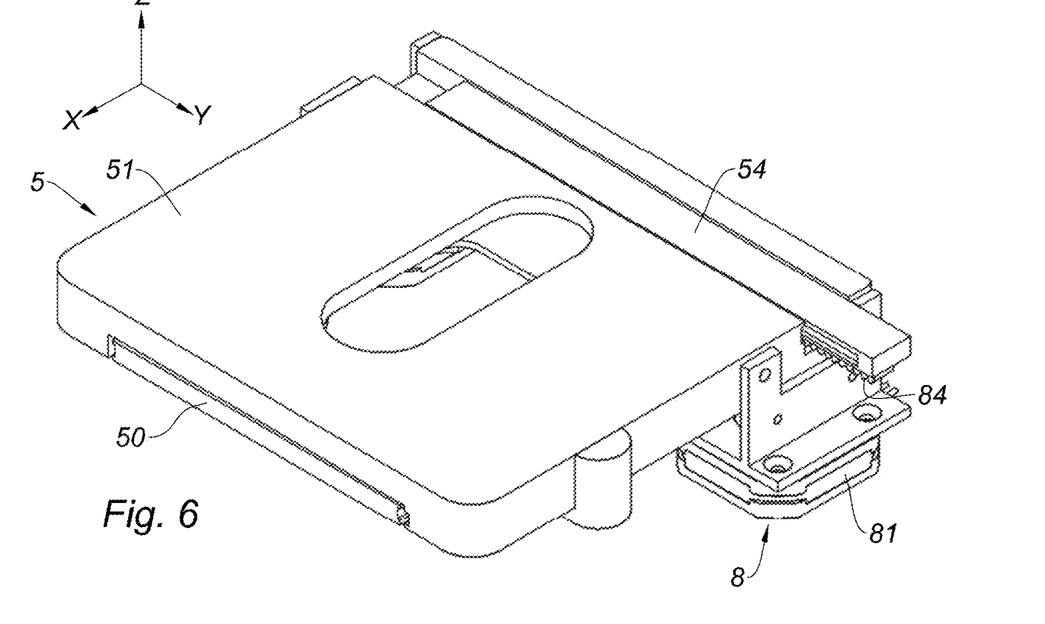
FIGS. 6 and 7 are perspective views, respectively top and bottom views, of the sample-holder of FIGS. 4 and 5 alone, where the pressing device is not completely illustrated, only its slide being illustrated.
Figure 7:
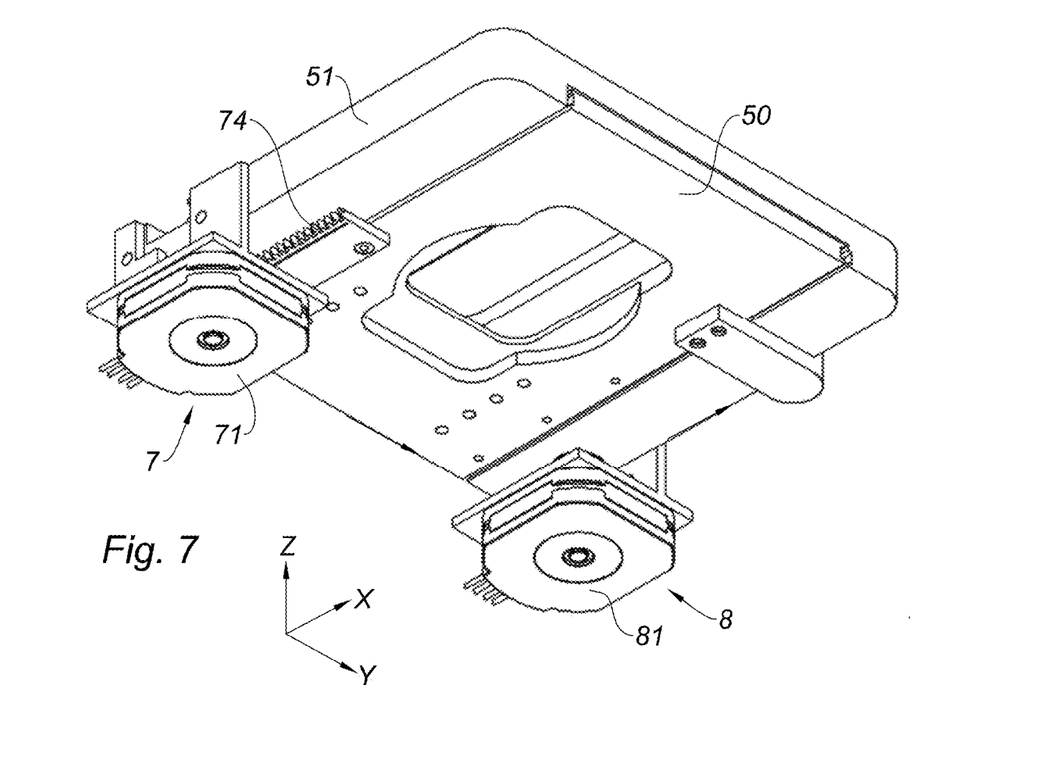
Figure 8:
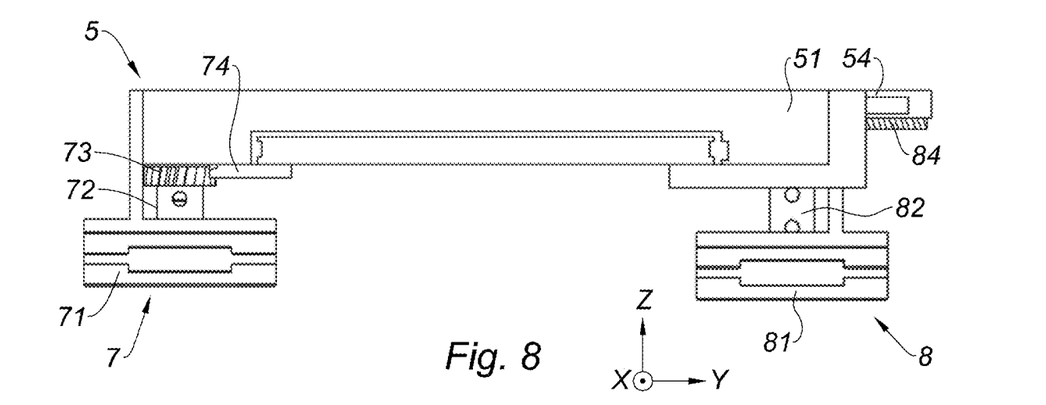
FIGS. 8 and 9 are schematic views, respectively front and back views, of the sample-holder of FIGS. 6 and 7.
Figure 9:
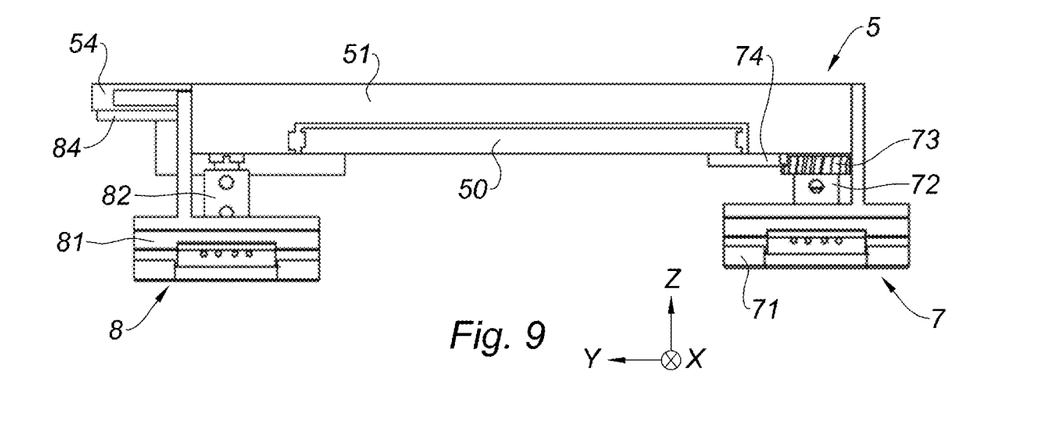
Figure 10:
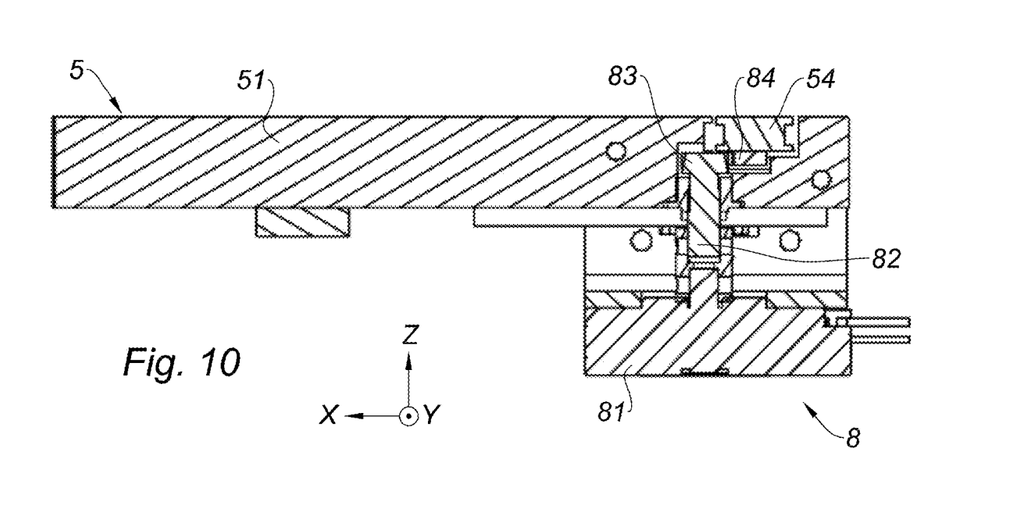
FIG. 10 is a schematic sectional view of the sample-holder of FIGS. 6 and 7, according to a sectional plane passing through the second motorized system.

Referring to FIGS. 1 to 3, an automated counting system 1, capable of implementing the counting method according to the disclosure, comprises a microscope 2 and a mobile terminal 3.

The microscope 2 is a phase-contrast microscope comprising a fixed structure formed by a frame 20 and by a pole 21, on which are mounted:
  an optical system 4 provided with a reticled ocular 40, an objective 41 and a motorized focusing system 43,
  a sample-holder 5 placed beneath and opposite the objective 41 and displaceable according to a first direction X and a second direction Y by means of a two-axis motorized system 7, 8 described later on,
  a controller (not illustrated) connected to the motorized focusing system 42 and to the two-axis motorized system 7, 8;
  a support 6 mounted on the ocular 40 of the optical system 4 and whose function is described later on;
  a light source 22 placed beneath the sample-holder 5 in the optical axis of the objective 41, this optical axis being parallel to the vertical direction Z;
  a condenser/convergent lens set 23 disposed between the light source 22 and the sample-holder 5.

The ocular 40 has a reticle 44 (shown in FIGS. 11 and 12) which will delimit the analysis areas of the sample. This reticle 44 is circular and will correspond to a diameter of the analysis area of the sample comprised between 50 and 150 micrometers, preferably in the range of 100 micrometers.

In the example of FIGS. 1 and 2, the microscope 2 comprises several objectives 41 mounted on a turret 45, so as to enable changing the objective, whereas in the example of FIG. 3, the microscope 2 comprises one single objective 41. As a non-limiting example, the objective 41 may have a 40x zooming.

The function of the motorized focusing system 43 consists in controlling the relative displacement of the objective 41 along its optical axis (in other words along the vertical direction Z) relative to the sample-holder 5, and comprises a rotary stepper motor. Thus, the motorized focusing system 43 may either control the displacement of the objective 41, or control the displacement of the sample-holder 5.

This motorized focusing system 43 offers a displacement step comprised between 0.5 and 3 micrometers, and in particular a step of 1 micrometer.

The sample-holder 5 is displaceable according to two directions X and Y, meaning that it is shaped so as to guide the displacement of the sample, once in place on the sample-holder, according to the two directions X and Y which define an analysis plane (X, Y) orthogonal to the optical axis of the objective 41, in other words orthogonal to the direction Z.

This sample-holder 5 comprises:
  a static lower subplate 50 provided with a central orifice for the passage of a convergent light flow coming from beneath, this lower subplate 50 extending in the analysis plane (X, Y);
  a movable upper subplate 51, provided with a central orifice for the passage of a convergent light flow coming from beneath, where this upper subplate 51 is slidably mounted on the lower subplate 50 according to the first direction X; and
  a pressing device 52 capable of pressing the sample on the upper subplate 51, where this pressing device 52 comprises at least one spring leaf 53 secured to a slide 54 slidably mounted on the upper subplate 51 according to the second direction Y.

When in place, the sample rests on the upper subplate 51, astride its central orifice, and is pressed by means of the pressing device 52.

The two-axis motorized system is shaped so as to actuate the displacement of the upper subplate 51 on the lower subplate 50 according to the first direction X and to actuate the displacement of the pressing device 52 on the upper subplate 51 according to the second direction Y, in order to ensure the displacement of the sample according to the two directions X and Y.

Referring to FIGS. 4 to 10, the two-axis motorized system comprises a first motorized system 7 capable of actuating the displacement of the upper subplate 51 over the lower subplate 50 according to the first direction X, wherein this first motorized system 7 comprises:
  a first rotary motor 71 fastened on one side of the upper subplate 51 and driving in rotation a first output shaft 72 on which a first pinion 73 is mounted, this first output shaft 72 being parallel to the vertical direction Z;
  a first rack 74 extending parallel to the first direction X and secured to the lower subplate 50, wherein the first pinion 73 meshes with this first rack 74 for a displacement of the upper subplate 51 according to the first direction X.

The two-axis motorized system comprises a second motorized system 8 capable of actuating the displacement of the pressing device 52 on the upper subplate 51 according to the second direction Y, wherein this second motorized system 8 comprises:
  a second rotary motor 81 fastened on one side of the upper subplate 51 and driving in rotation a second output shaft 82 on which a second pinion 83 is mounted, this second output shaft 82 being parallel to the vertical direction Z;
  a second rack 84 extending parallel to the second direction Y and secured to the slide 54 of the pressing device 52, wherein the second pinion 83 meshes with this second rack 84 for a displacement of the pressing device 52 according to the second direction Y.

The two motors 71, 82 consist of stepper motors and they impart, together with the aforementioned pinion/rack sets, stepped displacements of the sample-holder 5 with a step, for each direction X and Y, which may be comprised between 50 and 100 micrometers, and in particular a step of 75±5 micrometers. The two motors 71, 72 are connected via a wired link to the controller which controls their displacement.

The controller comprises an electronic board equipped with several microcontrollers which enable controlling the motor of the motorized focusing system 43, the two motors 71, 72 of the two-axis motorized system 7, 8 and the light source 22. The controller also comprises a remote control chip which will enable controlling with the mobile terminal 3 the motor of the motorized focusing system 43, the two motors 71, 72 of the two-axis motorized system 7, 8 and the light source 22.

The support 6 is mounted on the ocular 40 for supporting the mobile terminal 3 equipped with a digital image sensor (not shown). This support 6 may comprise:
- a base or shell which receives the mobile terminal 3, and
- an adapter, secured to the base or shell, which fits on the ocular 40 and which has a through orifice so that the digital image sensor of the mobile terminal 3 is positioned and held stable in front of the ocular 40 of the microscope 2 with an alignment between the optical axis of the ocular 40 and the center of the digital image sensor.

The mobile terminal 3 of the counting system 1 may consist of a smartphone or a digital tablet or a personal digital assistant, the support 6 being of course adapted to the dimensions and to the shape of the mobile terminal 3.

This mobile terminal 3 is equipped with a digital image sensor placed at the back of the mobile terminal 3, a screen 30 on the front of the mobile terminal 3, a processor (not illustrated) and a memory (not illustrated) in which is loaded a counting program, in particular in the form of an application.

The following description relates to the counting method for automated counting of microscopic fibers, and in particular of asbestos fibers, within a sample, by means of the counting system 1. In general, the microscopic fibers concerned by the counting method according to the disclosure are fibers having a width (or diameter) smaller than 15 micrometers and larger than 250 nanometers, a length larger than 5 micrometers, and a length-to-width (diameter) ratio greater than or equal to 3.

Beforehand:
- the sample is placed on the sample-holder 5 of the microscope 2, while being pressed on the upper subplate, astride its central orifice, by means of the pressing device 52; and
- the mobile terminal 3 is placed on the support 6 so that its digital image sensor is in front of the ocular 40 in the alignment of the optical axis of this ocular 40.

Afterwards, a connection is established between the processor of the mobile terminal 3 and the controller of the microscope 2, this connection may be established:
- either in a wired manner by means of a wired connector;
- or in a wireless manner by means of a radiocommunication.

In the case of a wired connection, a wired connector is provided, where the wired connector is connected to the controller of the microscope 2 and has a socket at the level of the support 6 for plugging the mobile terminal 3.

In the case of a wireless connection, each of the mobile terminal 3 and the controller of the microscope 2 has a radiocommunication module enabling a wireless communication, such as for example and without limitation a short-range radiocommunication such as a Bluetooth™, Bluetooth Low Energy™ or Zigbee™ radiocommunication.

Afterwards, the counting program, loaded in the memory of the mobile terminal 3, is launched for execution by the processor; this counting program being a computer program comprising code instructions capable of controlling the execution of several steps implemented by the processor in the context of the counting method. It should be noted that this counting program may be downloaded on a telecommunication network in the memory of the mobile terminal 3, in particular on a download platform.

Figure 11:
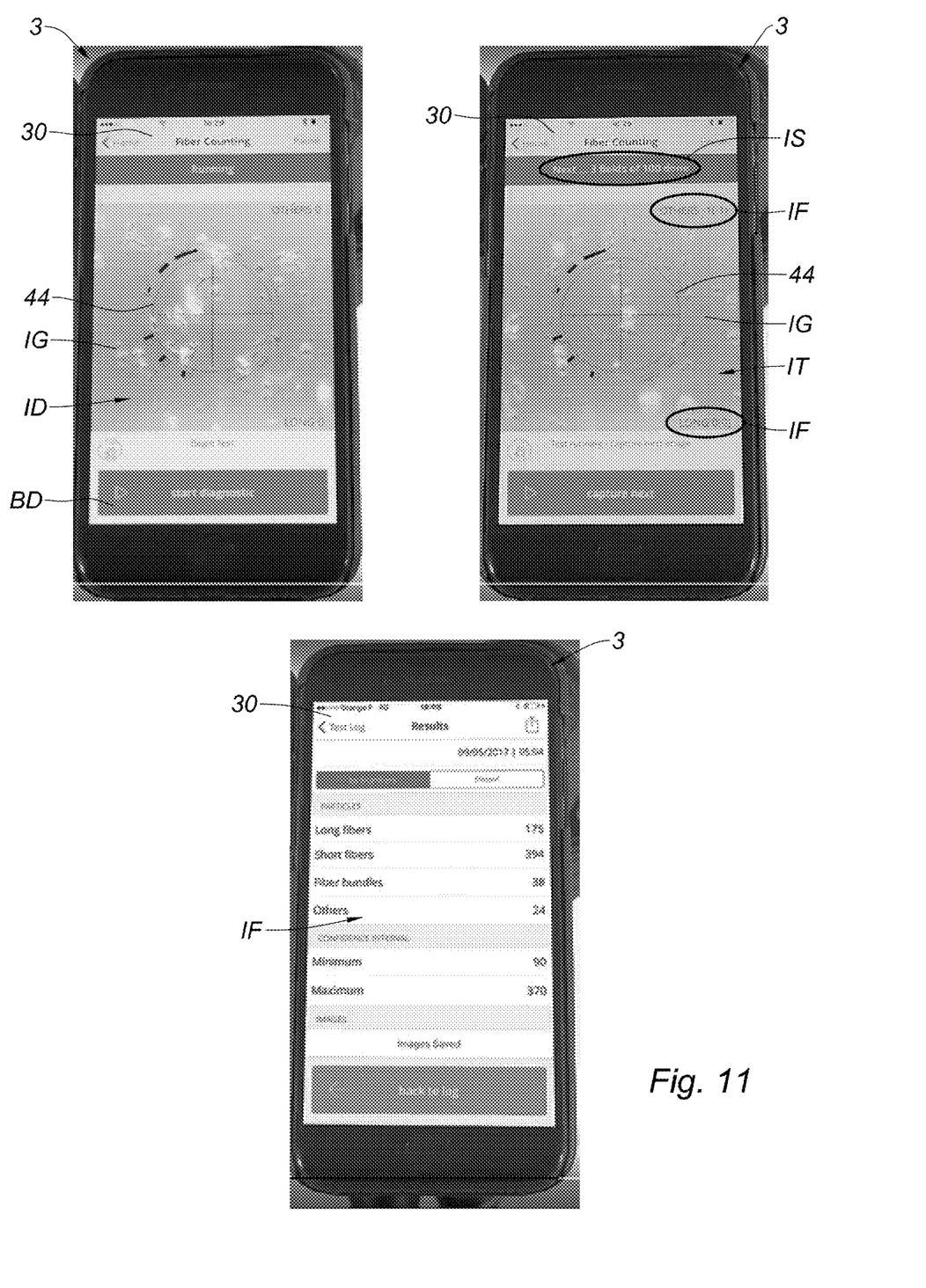
FIG. 11 schematically represents three interfaces displayed on the screen of the mobile terminal at the beginning of counting (at the top left), during counting (at the top right) and at the end of counting with a display of the counting result (at the bottom)

Once the counting program is launched, the screen 30 of the mobile terminal 3 can display a start interface ID as represented in FIG. 11 at the top left, wherein this start interface ID presents:
- a button BD labelled «start diagnostic» (the screen 30 being a touchscreen) which will enable the start-up of the counting sequences described hereinafter;
- the image IG as captured by the digital image sensor, with the reticle 44 (or at least the image of the reticle) at its center.

Figure 15:
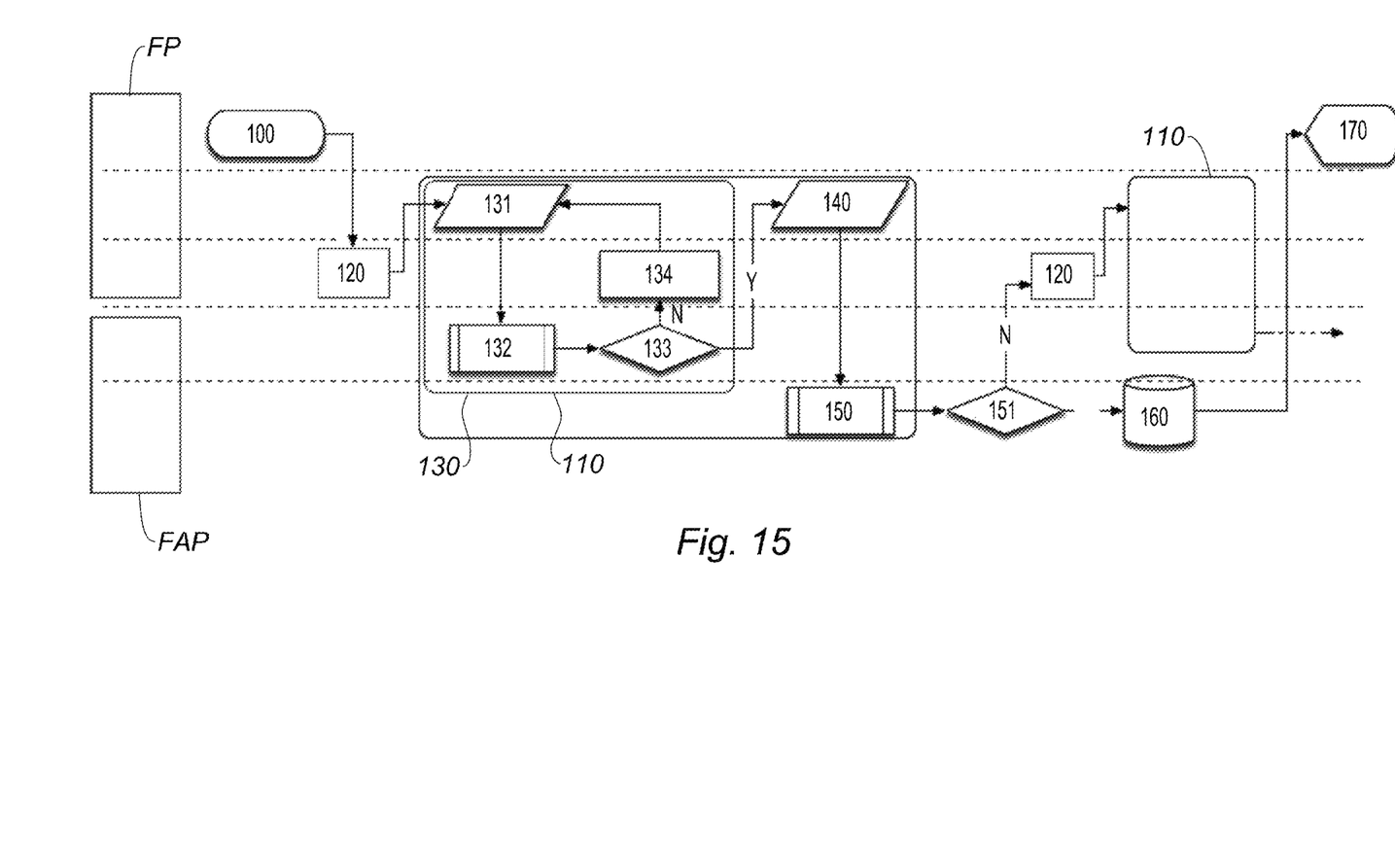
FIG. 15 is a block diagram illustrating the counting sequences implemented in the counting method according to the disclosure.

Referring to FIG. 15, the counting program implements a counting phase after a start-up phase 100 initiated by pressing on the button BD of the start interface ID.

This counting phase implements successive sequences 110 of counting the microscopic fibers on distinct analysis areas of the sample. In FIG. 15, only the first counting sequence 110 is fully schematized, then a second counting sequence 110 is schematized by a simple block and the next counting sequences 110 are not illustrated.

During this counting phase, between two successive counting sequences 110, the processor controls the two-axis motorized system 7, 8 to position the objective over a new analysis area of the sample. Thus, before each counting sequence 110, the processor begins by a step 120 of controlling the two-axis motorized system 7, 8 to displace the sample-holder 5 according to the directions X and Y.

Afterwards, for each counting sequence 110, the processor implements the following steps:
- a step 130 of setting the focus on the corresponding analysis area by controlling the motorized focusing system 43;
- a step 140 of capturing a main image of the corresponding analysis area by triggering the digital image sensor, wherein the main image is taken in high definition;
- a step 150 of analyzing the main image for counting the number of microscopic fibers on the corresponding analysis area, inside the reticle 44.

The step 130 of setting the focus implements a closed-loop control in which the processor performs the following steps:
- a step 131 of capturing a secondary image of the corresponding analysis area by triggering the digital image sensor, wherein the secondary image is taken at low definition;
- a step 132 of analyzing the secondary image in order to establish the value of a sharpness parameter, representative of a sharpness of the secondary image;
- a step 133 of comparing the value of the sharpness parameter with a predefined maximum threshold, and where:
- if the value of the sharpness parameter reaches or exceeds this maximum threshold, then the processor stops the control of the motorized focusing system in order to fix the focus so as to switch into the step 140 of capturing a main image (arrow Y in FIG. 15);
- if the value of the focus parameter is below this maximum threshold (arrow N in FIG. 15), then the processor performs a step 134 of controlling the motorized focusing system 43 (control of the motor of the motorized focusing system 43 for the displacement of the objective 41 or of the sample-holder 5 according to the direction Z) so as to modify the focus, and resumes the step 131 of capturing a secondary image so as to repeat the previous steps until the value of the sharpness parameter reaches or exceeds this maximum threshold.

In a non-illustrated variant, it is conceivable that the step 130 of setting the focus implements an open-loop control in which the processor performs a fixed number of successive focusing sequences (for example between 3 and 10 focusing sequences), wherein between two successive focusing sequences, the processor performs a step of controlling the motorized focusing system 43 to modify the focus, and wherein for each focusing sequence, the processor implements the following steps:

a step of capturing a secondary image of the corresponding analysis area by triggering the digital image sensor, wherein the secondary image is taken at low definition;

a step of analyzing the secondary image in order to establish a value of a sharpness parameter representative of a sharpness of the secondary image;

wherein the focus retained for the step 140 of capturing a main image corresponds to the focus of the focusing sequence where the value of the sharpness parameter is maximum.

This open-loop variant allows limiting the number of focusing sequences to a fixed number, in order to reduce the focusing calculation time.

The aforementioned sharpness parameter may correspond to a ratio between a surface area of a halo region (characteristic of a phase-contrast microscopy) and a surface area of a central region surrounded by the halo region. Of course, other types of sharpness parameters may be considered for the implementation of the method.

As shown in FIG. 15, the processor implements a multitask management distributed between a main queue FP and a background queue FAP, where:

the processor performs in the main queue FP the following steps:

the steps 120 of controlling the two-axis motorized system 7, 8;

the steps 134 of controlling the motorized focusing system 43;

the steps 131 of capturing the secondary images;

the steps 140 of capturing the main images;

the processor performs in the background queue FAP the following steps (the most expensive in terms of resources):

the steps 132 of analyzing the secondary images;

the comparison steps 133; and the steps 150 of analyzing the main images.

Thus, with this multitask management, once the step 150 of analyzing the main image has begun, it is followed by a step 151 of checking whether the calculation of the number of microscopic fibers has completed and:

if the calculation has not completed yet (arrow N in FIG. 15), then the processor triggers, in the main queue FP, the step 120 of controlling the two-axis motorized system 7, 8 to set over a new analysis area, and afterwards, it engages the next counting sequence 110 which begins with a step 131 of capturing a secondary image which is also performed in the main queue FP; and if the calculation has completed (arrow Y in FIG. 15), then the processor performs:

a step 160 of storing the number of microscopic fibers counted during the concerned counting sequence 110 in a dedicated memory of the mobile terminal 3; then a step 170 of displaying on the screen 30 of the mobile terminal 3 the number of counted microscopic fibers with an update as the counting sequences are carried out.

When the counting program is launched, the screen 30 of the mobile terminal 3 may display an intermediate interface IT as represented in FIG. 11 at the top right, wherein this intermediate interface IT presents:

the image IG as captured by the digital image sensor, with the reticle 44 (or at least the image of the reticle) at its center;

one or several updated information IF on the number of counted microscopic fibers, cumulated throughout the successive counting sequences, possibly with a distinction between different lengths or ranges of microscopic fibers;

an updated information IS on the number of performed counting sequences (in other words on the number of analyzed analysis areas).

It is provided that the processor stops the counting sequences 110 when either one of the following conditions is met:

first condition: the number of microscopic fibers counted and cumulated throughout the counting sequences reaches a given fibers threshold, for example 100;

second condition: the number of counting sequences reaches a given sequences threshold, for example 100.

It is conceivable that the number of counted microscopic fibers and the number of performed counting sequences are displayed in the form of two progress bars disposed in parallel, wherein each progress bar is filled as the corresponding number increases until reaching the end of the bar which corresponds to the corresponding fibers threshold or sequences threshold. Thus, the first one of the two bars that is filled puts an end to the counting sequences.

Once the processor has stopped the counting sequences 110, it is provided that the final display step consisting in displaying the number of counted and cumulated microscopic fibers (possibly with a classification into different lengths or ranges of microscopic fibers) and the number of performed counting sequences.

Thus, at the end of the counting program, the screen 30 of the mobile terminal 3 may display a final interface IF as represented in FIG. 11 at the bottom, wherein this final interface IF presents as example:

the number of long fibers («long fibers»);

the number of short fibers («short fibers»);

the number of fiber bundles («fiber bundles»);

the number of other types of fibers («other fibers»);

wherein these ranges of fibers are characterized according to predefined parameters (possibly parametrizable) in the counting program.

Figure 12:
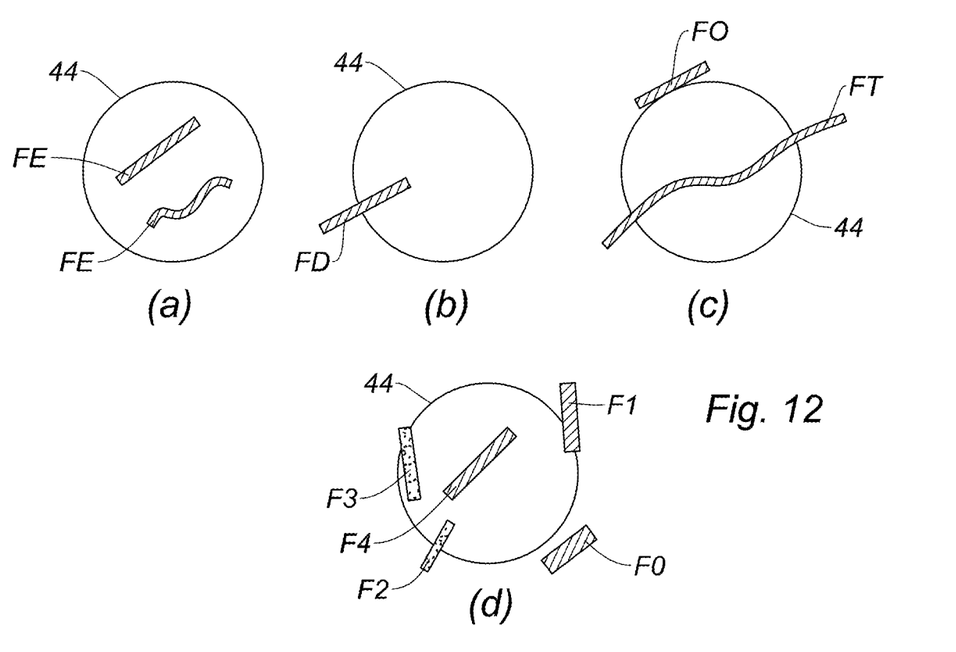
FIG. 12 schematically represents four case scenarios of counting microscopic fibers within a reticle.

As regards the counting implemented during the step 150 of analyzing the main image, this counting is performed, with reference to the images (a), (b) and (c) of FIG. 12, by applying the following rules:

each fiber FE having its two ends inside the reticle 44 is counted as 1 fiber;

each fiber FD having one end inside the reticle 44 and another end outside the reticle 44 is counted as ½ fiber;

each fiber FO which is totally outside the reticle 44 is not counted;

each fiber FT which crosses the reticle and which has its two ends outside the reticle 44 is not counted.

In a counting variant substantially equivalent to that described hereinabove, counting is performed, with reference to the image (d) of FIG. 12 and by assimilating one fiber with a rectangle having four corners (or vertices), by applying the following rules:

each fiber F4 having its four corners inside the reticle 44 is counted as 1 fiber;

each fiber F2, F3 having two or three corners inside the reticle 44 is counted as ½ fiber;

each fiber F0, F1 having zero or one corner inside the reticle 44 is not counted.

Between two successive counting sequences 110, the processor controls the two-axis motorized system 7, 8 according to a predefined scan path for positioning the objective over the new analysis area of the sample while care is taken that the new analysis area is distinct from each of the previously-analyzed analysis areas, in order to avoid an overlap between two analysis areas. As example, the analysis areas should not overlap while remaining spaced apart from each other by a minimum distance of 100 micrometers.

Figure 13:
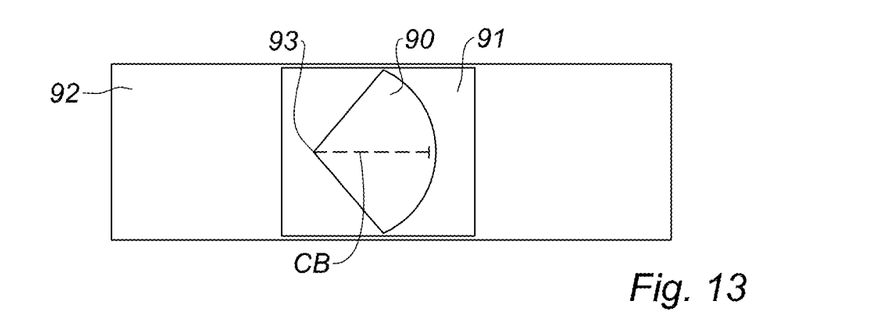
FIGS. 13 and 14 are top views of a sample in place on the sample-holder, with two examples of scan paths.
Figure 14:
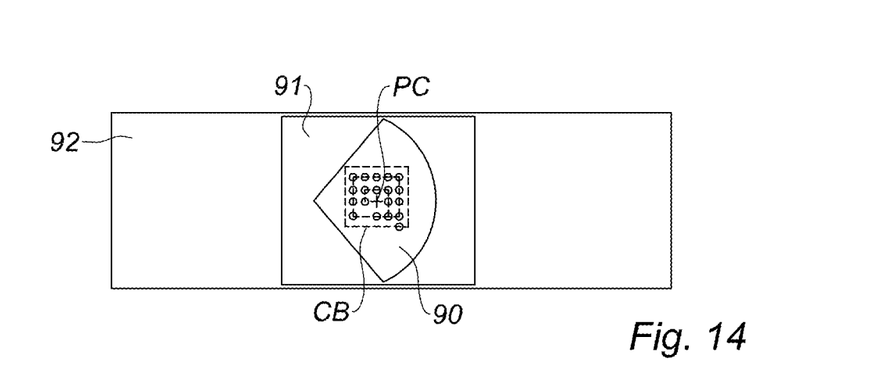

Referring to FIGS. 13 and 14, the scan path CB may be established inside a quarter-circle sector 90 with a filter 91 temporarily superimposed over the image and movable on a glide 92, such a quarter-circle sector 90 having for example an arc radius of 12.5 millimeters, after having marked beforehand on the sample the center 93 of the quarter-circle sector 90. The scan path CB may be defined inside this quarter-circle sector 90, while keeping about 1 millimeter with respect to the borders.

In the example of FIG. 13, the scan path CB is a linear path starting substantially from the center 93 and extending according to a radial direction over a total length of about 10 millimeters, so that it is possible to dispose 100 analysis areas, with a distance of 100 micrometers between two adjacent analysis areas.

In the example of FIG. 14, the scan path CB is a pseudo-random spiral path around a central point PC, which does not depend on the orientation of the sample but which depends on the choice of the central point PC which may be selected beforehand on the screen 30 of the mobile terminal 3 in a configuration or options menu of the counting program. Thus, an operator chooses his central point PC from a drawing on the screen 30 of the mobile terminal 3, and the operator may be enabled to refine this position by touching and by tactilely sliding the filter 91 on the glide 92, and at the end, this central point PC and this orientation of the filter 91 will be stored as user parameters and recalled at the beginning of each test.

In a non-illustrated example, the scan path CB may be random or non-periodic.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A counting method for automated counting of microscopic fibers within a sample, said counting method comprising the following steps of:

providing a phase-contrast type microscope comprising an optical system provided with an ocular, an objective and a motorized focusing system, a sample-holder placed opposite the objective and displaceable according to two directions (X, Y) of an analysis plane by means of a two-axis motorized system, and a controller connected to the motorized focusing system and to the two-axis motorized system;

providing a mobile terminal equipped with a digital image sensor, a screen, a processor and a memory in which is loaded a counting program;

placing the sample on the sample-holder of the microscope;

disposing the mobile terminal on a support of the microscope so that the digital image sensor is positioned and held stable in front of the ocular of the microscope with an alignment between the optical axis of the ocular and the center of the digital image sensor;

establishing a connection between the processor of the mobile terminal and the controller of the microscope;

launching the counting program so that the processor of the mobile terminal performs successive counting sequences on distinct analysis areas of the sample, wherein between two successive counting sequences the processor controls the two-axis motorized system to position the objective over a new analysis area of the sample, and wherein for each counting sequence the processor implements the following steps of:

setting the focus on the corresponding analysis area comprising a control of the motorized focusing system;

capturing a main image of the corresponding analysis area by triggering the digital image sensor;

analyzing said main image in order to count the number of microscopic fibers on the corresponding analysis area.

2. The counting method according to claim 1, wherein, for each counting sequence, the setting of the focus implements an open-loop control in which the processor performs several successive focusing sequences, wherein between two successive focusing sequences the processor controls the motorized focusing system to modify the focus, and wherein for each focusing sequence the processor implements the following steps of:
   capturing a secondary image of the corresponding analysis area by triggering the digital image sensor;
   analyzing said secondary image in order to establish a value of a sharpness parameter representative of a sharpness of the secondary image;
   wherein the focus retained for the capture of the main image corresponds to the focus of the focusing sequence where the value of the sharpness parameter is maximum.

3. The counting method according to claim 1, wherein, for each counting sequence, the setting of the focus implements a closed-loop control in which the processor performs the following steps of:
   capturing a secondary image of the corresponding analysis area by triggering the digital image sensor;
   analyzing said secondary image in order to check whether a sharpness parameter, representative of a sharpness of the secondary image, reaches a predefined maximum threshold, where:
   if the sharpness parameter reaches or exceeds said maximum threshold, then the processor stops the control of the motorized focusing system in order to fix the focus for the capture of the main image;
   if the focus parameter is below said maximum threshold, then the processor controls the motorized focusing system to modify the focus and repeats the previous steps until the sharpness parameter reaches or exceeds said maximum threshold.

4. The counting method according to claim 2, wherein the processor performs the captures of the main images with a given main resolution, and performs the captures of the secondary images with a given secondary resolution which is lower than the main resolution.

5. The counting method according to claim 2, wherein the sharpness parameter corresponds to a ratio between a surface area of a halo region characteristic of a phase-contrast microscopy and a surface area of a central area surrounded by the halo region.

6. The counting method according to claim 1, wherein the processor stops the counting sequences when the number of microscopic fibers counted and cumulated throughout the counting sequences reaches a given fibers threshold or when the number of counting sequences reaches a given sequences threshold.

7. The counting method according to claim 1, wherein the processor displays on the screen of the mobile terminal the number of counted microscopic fibers and the number of performed counting sequences with an update as the counting sequences are carried out.

8. The counting method according to claim 7, wherein the number of counted microscopic fibers and the number of performed counting sequences are displayed in the form of two progress bars, wherein each progress bar is filled as the corresponding number increases until reaching the end of the progress bar which corresponds to the corresponding fibers threshold or sequences threshold, so that the processor stops the counting sequences as soon as one of the two progress bars is filled.

9. The counting method according to claim 1, wherein, for each counting sequence, the processor implements a multitask management distributed between a main queue and a background queue, where:
   the processor performs in the main queue the steps of capturing images and the steps of controlling the two-axis motorized system and the motorized focusing system, and
   the processor performs in the background queue the steps of analyzing the images, so that, between two consecutive counting sequences, the processor performs the control of the two-axis motorized system on the main queue before the end and in parallel with the analysis of the main image of the previous counting sequence which is performed on the background queue.

10. The counting method according to claim 9, wherein, between two successive counting sequences, the processor controls the two-axis motorized system according to a predefined scan path (CB) to position the objective over a new analysis area of the sample while care is taken that said new analysis area is distinct from each of the previously-analyzed analysis areas.

11. The counting method according to claim 10, wherein the predefined scan path (CB) is a random path.

12. The counting method according to claim 1, wherein the two-axis motorized system comprises:
   a first rotary motor driving in rotation a first output shaft on which is mounted a first pinion meshing with a first rack coupled to the sample-holder for a displacement according to a first direction (X); and
   a second rotary motor driving in rotation a second output shaft on which is mounted a second pinion meshing which a second rack coupled to the sample-holder for a displacement according to a second direction (Y);
   so that, when the processor controls the two-axis motorized system to displace the sample-holder, the processor controls at least one among the first rotary motor and the second rotary motor.

13. The counting method according to claim 1, wherein the two-axis motorized system ensures a stepped displacement of the sample-holder according to two directions so that, when the processor controls the two-axis motorized system to displace the sample-holder, the processor controls a stepped displacement of the sample-holder.

14. The counting method according to claim 1, wherein the counting method is implemented for automated counting of asbestos fibers within a sample.

15. The counting method according to claim 1, using as a mobile terminal a smartphone or a digital tablet or a personal digital assistant.

16. The counting method according to claim 1, wherein the connection between the processor of the mobile terminal and the controller of the microscope is established:
   either in a wired manner by means of a wired connector;
   or in a wireless manner by means of a radiocommunication in particular a short-range radiocommunication such as a for example a Bluetooth™, Bluetooth Low Energy™ or Zigbee™ radiocommunication.

17. A microscope adapted for the implementation of the counting method according to any one of the preceding claims, said microscope being a phase-contrast microscope comprising:
   an optical system provided with an ocular, an objective and a motorized focusing system,
   a sample-holder placed opposite the objective and displaceable according to two directions by means of a two-axis motorized system, a controller connected to the motorized focusing system and to the two-axis motorized system; and a support mounted on the optical system at the level of the ocular, said support being shaped so as to support a mobile terminal equipped with a digital image sensor so that said digital image sensor is positioned and held stable in front of the ocular of the microscope with an alignment between the optical axis of the ocular and the center of the digital image sensor.

18. A system for automated counting of microscopic fibers within a sample, said automated counting system comprising:

a microscope adapted for the implementation of the counting method according to any one of the preceding claims, said microscope being a phase-contrast microscope including:

an optical system provided with an ocular, an objective and a motorized focusing system, a sample-holder placed opposite the objective and displaceable according to two directions by means of a two-axis motorized system, a controller connected to the motorized focusing system and to the two-axis motorized system; and a support mounted on the optical system at the level of the ocular, said support being shaped so as to support a mobile terminal equipped with a digital image sensor so that said digital image sensor is positioned and held stable in front of the ocular of the microscope with an alignment between the optical axis of the ocular and the center of the digital image sensor;

a mobile terminal equipped with a digital image sensor, a screen, a processor and a memory in which is loaded a counting program configured to perform the steps implemented by the processor in the counting method according to any one of claims 1 to 16;

wherein the support of the microscope supports said mobile terminal so that said digital image sensor is positioned and held stable in front of the ocular of the microscope with an alignment between the optical axis of the ocular and the center of the digital image sensor.

19. A non-transitory computer-readable medium adapted to be loaded in a memory of a mobile terminal and comprising code instructions capable of controlling the execution of the steps implemented by the processor in the counting method according to claim 1 when it is executed on the mobile terminal.

20. The non-transitory computer-readable medium of claim 19, wherein the computer-readable medium is downloadable on a telecommunication network in a memory of a mobile terminal.

* * * * *